United States Patent [19]

Hallam

[11] 3,716,105
[45] Feb. 13, 1973

[54] GRADING ATTACHMENT FOR A VEHICLE

[75] Inventor: Edwin Carey Hallam, Smeeton Westerby, England

[73] Assignee: E. C. Hallam Company, a partnership consisting of Edwin C. Hallam and Heather Hallam, Smeeton Westerby, Leicester, England

[22] Filed: Nov. 23, 1970

[21] Appl. No.: 91,928

[52] U.S. Cl. .................. 172/780, 172/781, 172/447, 280/492
[51] Int. Cl. ............................................. E02f 3/76
[58] Field of Search...... 172/796, 779, 780, 781, 784, 172/798, 439, 446, 447, 196, 199; 280/492, 493, 460 A, 461 A, 416 A, 43.23, 104.5; 180/9.4

[56] References Cited

UNITED STATES PATENTS

| 3,486,567 | 12/1969 | Weaver | 172/796 X |
| 3,498,639 | 3/1970 | Hawk | 280/492 |
| 2,484,280 | 10/1949 | Fuston | 280/104.5 |
| 3,595,320 | 7/1971 | Mittelstadt | 172/781 |
| 2,881,541 | 4/1959 | Darnell | 172/780 X |
| 2,843,948 | 7/1958 | Lindeman et al. | 172/780 X |
| 2,880,528 | 4/1959 | Lusk | 172/199 |
| 3,266,181 | 8/1966 | Olafson | 172/780 |

Primary Examiner—Robert E. Pulfrey
Assistant Examiner—Stephen C. Pellegrino
Attorney—Larson, Taylor and Hinds

[57] ABSTRACT

A trailing grading attachment for use with a tractor vehicle has its grader blade depending from the central part of a frame which is supported by rear wheels and by a forward towing connection that permits the trailer frame to pivot relatively to the tractor vehicle both about a vertical axis and about an approximately horizontal axis extending longitudinally of the tractor vehicle, and also has that part of the frame which extends forwardly from above the central part of the grader blade confined, as viewed in plan, to the region of the longitudinal center line of the trailer frame.

12 Claims, 5 Drawing Figures

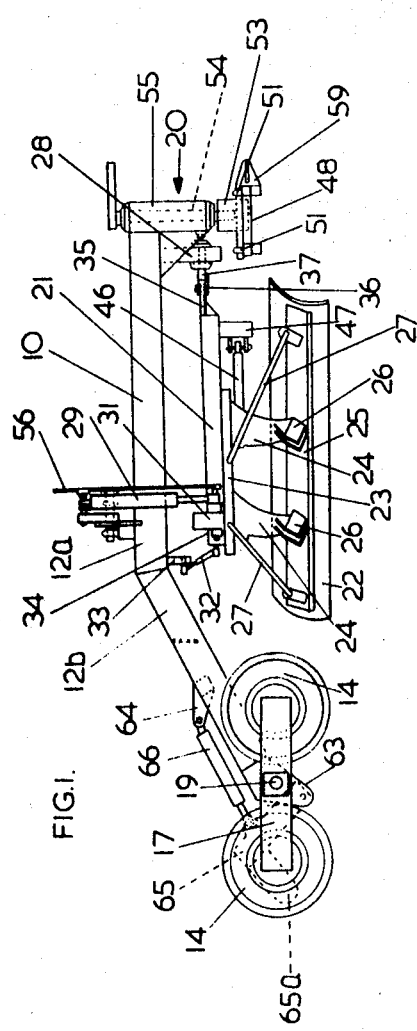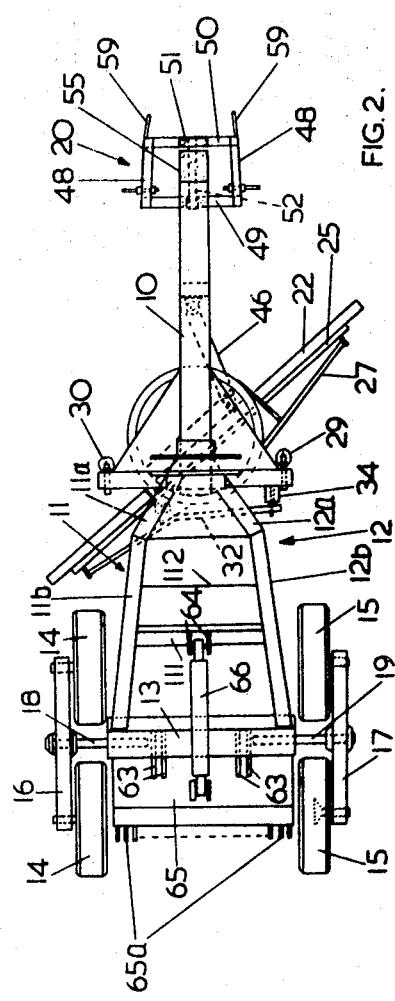

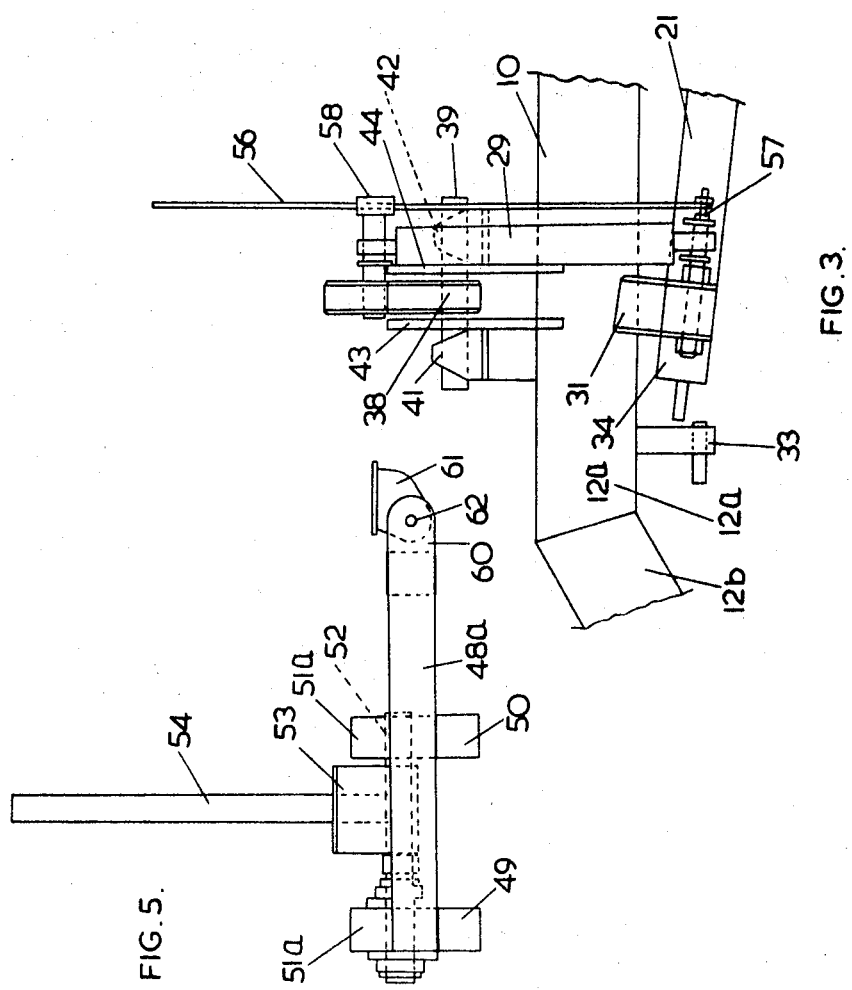

GRADING ATTACHMENT FOR A VEHICLE

This invention concerns a grading attachment for a vehicle and seeks to provide an effective and relatively inexpensive attachment which can be used conveniently with a tractor vehicle (whether driven by wheels or endless tracks) for grading of earth and similar surfaces.

The invention provides for use with a wheel driven or endless track driven tractor vehicle, a trailing attachment comprising a frame supported at the rear by laterally spaced wheels and forwardly by means of a towing connection for attachment to the tractor vehicle, and having an adjustable grader blade and means mounting said grader blade to depend below and athwart the said frame at a position between the forward end thereof and the rear wheels, wherein the said towing connection comprises pivot means permitting the trailer frame to turn relatively to the tractor vehicle both about a vertical axis and about an approximately horizontal axis extending longitudinally of the tractor vehicle, and wherein the forward part of the trailer frame which extends from its front end to above the central part of the grader blade, is as viewed in plan, confined to the region of the longitudinal center line of the trailer frame. This form of construction offers considerable scope in grading operations by means of a robust and relatively inexpensive attachment. The pivotal movements permitted by the pivot means on the towing connection enable effective grading action to be secured by comparatively simple equipment and the confining of the forward part of the trailer frame to the region of the longitudinal center line enables a tractor with the grading attachment coupled to it to turn in a circle of a substantially shorter radius than would otherwise be possible.

Advantageously the said forward part of the trailer frame forms a backbone-like connection between the towing connection and the rearward part of the trailer frame. The rearward part of the frame may comprise two longitudinal members diverging laterally rearwards from the said forward part of the trailer frame. In one convenient form of construction the rearward part of the trailer frame has laterally spaced longitudinal members which include parts at high level diverging rearwardly at a substantial angle from the rear end of the said forward part of the trailer frame and other parts continuing rearwardly with a more gradual divergence and with a downward slope to a mounting for the rear wheels. These features assist in the provision of a particularly robust frame of comparatively simple construction suitable for carrying the grader blade mounting.

Conveniently in practising the invention the trailer frame is supported at the rear by a pair of wheels at each side forming tandem wheels, with each pair mounted on a common carrier and with the carriers pivoted to rock independently of one another about a common transverse horizontal axis positioned between the axes of the wheels of each pair.

The said towing connection may comprise a tow-bar frame having side pieces for connection either to lift arms or to special pivot mountings on a tractor vehicle, a cross-bar fixed across one end of the side pieces, a first pivot rod extending centrally from the cross-bar along the tow-bar frame between the side pieces, a block pivoted on the first pivot rod to rock about an approximately horizontal axis extending longitudinally of the tractor vehicle, a second pivot rod extending vertically from the block, and a bearing member embracing the second pivot rod and extending downwardly from the front of the forward part of the trailer frame.

An attachment according to the invention may have the said grader blade adjustably carried on a sub-frame mounted to extend under the said forward part of the trailer frame and anchored by a pivotal connection to a bracket at the front end of said forward part in such manner as to permit limited lateral movement of the sub-frame and also free rotational movement of the sub-frame about a horizontal axis extending longitudinally of the trailer frame, the rearward part of the sub-frame being acted upon by fluid-pressure-operated rams one at each side depending from a mounting means on the trailer frame. The attachment of the sub-frame to the bracket on the trailer frame may comprise a horizontal pivot-rod mounted to turn in a bearing in said bracket about an axis extending longitudinally of the trailer frame, and a forked member extending rearwardly from said pivot rod and embracing a forward end part of the sub-frame, being attached thereto by an upstanding pivot pin. The fluid-pressure-operated rams acting on the sub-frame may be anchored respectively to opposite ends of a transverse lever pivoted on a shaft mounted between brackets on the rear end of the forward part of the trailer frame and extending longitudinally thereof, said transverse lever being mounted between plates providing alternative clamping positions at different levels for arms of said transverse lever to provide for alternative settings of the grader blade offset about a horizontal axis extending longitudinally of the trailer frame.

The provisions of the invention will now be more particularly described in relation to a convenient embodiment of the invention which is illustrated in the accompanying drawings, in which, FIG. 1 is a side elevation view of a trailer grading attachment;

FIG. 2 is a plan view of the attachment;

FIG. 3 is an enlarged detailed view in elevation of certain of the parts shown in FIG. 1;

FIG. 5 is a detailed side elevation drawn to an enlarged scale showing parts of a modified form of the towing connection at the front of the trailer.

Figure 4:
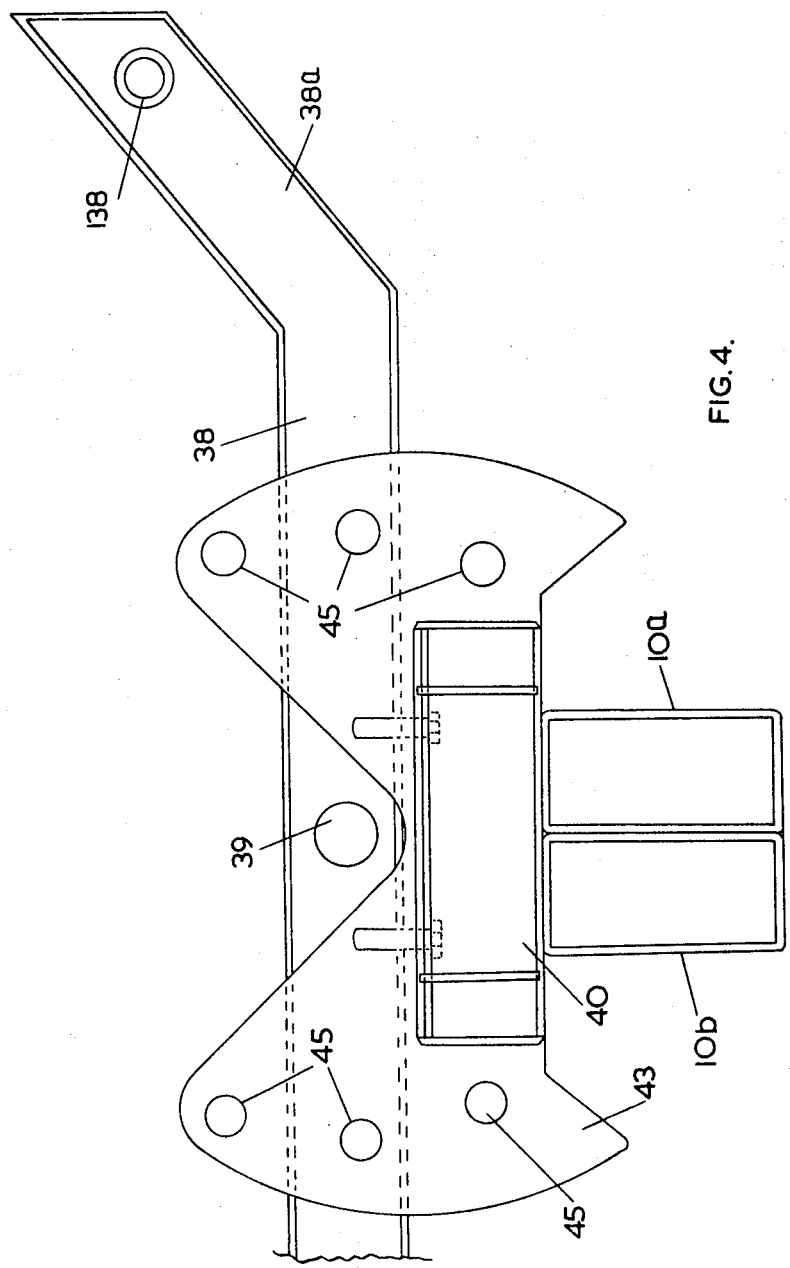
FIG. 4 is an enlarged view of certain of the parts shown in FIG. 3 as seen in end elevation viewed from the left of FIG. 3 and partly broken away.

The grading trailer attachment shown in FIGS. 1 and 2 has a trailer frame comprising an upper horizontal forward part 10 which as viewed in plan in confined to the region of the longitudinal center line of the trailer frame, and a rearward part comprising two longitudinal members 11 and 12 diverging laterally rearwards from the forward part 10. Said forward part may be composed of two hollow metal beams of box-section indicated at 10a and 10b in FIG. 4 welded together back to back. The spaced longitudinal members 11 and 12 include parts 11a and 12a at high level diverging rearwardly at a substantial angle from the rear end of the forward part 10 and other parts 11b and 12b continuing rearwardly with a more gradual divergence and a downward slope to a mounting cross bar 13 for rear wheels indicated at 14 and 15. These are in pairs forming tandem wheels, one pair 14 being mounted on a common carrier 16 and the other pair 15 being mounted on a similar carrier 17. The carriers 16 and 17 are mounted to turn on pivot rods 18 and 19 projecting laterally in axial alignment from the cross bar 13. The frame parts 11b and 12b are braced by cross-members 111 and 112.

The forward part 10 of the frame forms a backbone-like connection between a towing connection shown generally at 20 and the rearward part 11,12 of the trailer frame. Beneath the forward part 10 of the frame there is mounted a sub-frame 21 on which a grader blade 22 is adjustably mounted. There is a ring 23 which can turn about a vertical axis on the frame 21 and which carries depending brackets 24 to which a backing strip 25 of the blade 22 is anchored at 26. The anchorages 26 and link rods 27 which connect the upper parts of the backing piece 25 to the ring 23 are arranged to permit adjustment of the slant of the grader blade 22 as viewed edgewise from one end of the blade.

The sub-frame 21 is slung between a bracket 28 depending from near the front end of the forward frame part 10, on the one hand, and two fluid pressure operated (e.g. hydraulic) rams 29 and 30 on the other hand. The rams 29 and 30 are positioned one on each side of the trailer frame and serve to raise and lower the grader blade as required. The rams 29 and 30 are anchored to posts on a cross member 31 of the sub-frame 21 there being an adjustable telescopic steadying link 32 connected between posts respectively on a bracket 33 depending from the frame part 11a and a block 34 on the cross bar 31. At the forward end of the sub-frame 21 there is an extension plate 35 which engages freely between the upper and lower parts of a forked member 36 to which it is pivotally anchored by a cross pin. The forked member 36 is attached to a spindle 37 which can turn in a bearing in the bracket 28 on an axis which extends horizontally and longitudinally of the trailer frame. This permits the sub-frame 21 to cant laterally in a manner and for a purpose about to be explained.

FIG. 3 shows on a somewhat larger scale certain of the parts illustrated in FIG. 1 above the rear end of the frame part 10, and FIG. 4 shows a further enlarged end view of some of these parts. By reference to these Figures it will be seen that the anchorages of the rams 29 and 30 consist of posts fixed to the upwardly slanted ends 38a of a cross lever 38 which are apertured at 138 to receive the anchorage posts. The lever 38 is pivoted centrally on a short shaft 39 extending longitudinally of the trailer frame. Above the rear end of the frame part 10 there is secured (e.g. welded) to it a box-like structure 40 on which are two brackets 41 and 42 (see FIG. 3) in which the ends of the shaft 39 are mounted. Straddling the central part of the lever 38 are two winged plates 43 and 44 which are formed at each side with anchorage holes 45 at different levels on circular arcs concentric with the axis of the shaft 39. Through selected ones of the anchorage holes 45 at each end of the plates 43 and 44 may be passed bolts to extend also through corresponding holes in the lever 38 to provide anchorages for the lever 38 which may thus be set in a horizontal attitude as seen in FIG. 4 or canted downwardly to the right or the left as seen in that Figure. Such adjustment of the lever 38 can cause the rams 29 and 30 to cant the sub-frame laterally either way or retain it in a level setting this adjustment being permitted by the pivot rod 37 turning in the bearing bracket 28.

The lateral canting of the sub-frame 21 offers the advantage that the grading attachment may be used more effectively for levelling soil on sloping ground by drawing the trailing attachment across the slope with the tractor vehicle and the trailing attachment canted laterally with the slope and the operative edge of the grader blade 22 in a horizontal or more nearly horizontal attitude. It will be appreciated that the grader blade 22 is normally operated slantwise of the longitudinal center line of the trailer frame as viewed in plan and its setting in such slanted attitude can be adjusted by a fluid pressure operated (for example hydraulically operated) ram 46, FIG. 1 connected between an anchorage on the ring 23 and one on a bracket 47 which depends from the forward end of the sub-frame 21.

The towing connection 20, FIGS. 1 and 2, comprises a tow bar frame consisting of longitudinal side pieces 48 and cross bars 49 and 50 the side pieces having fixed to them forward brackets 59 by the aid of which the side pieces are bolted rigidly at spaced points to lift arms on a tractor vehicle, the raising links of the lift arms having been disconnected from them. The cross bars 49 and 50 support bearing brackets 51 for a first pivot rod 52 extending centrally along the tow bar frame between the side pieces 48. Pivoted on the rod 52 is a block 53 which can thus rock about an approximately horizontal axis extending longitudinally of the tractor vehicle. A second pivot rod 54 extends vertically from the block 53 and engages in a bearing member 55 FIG. 1, attached to the forward end of the frame part 10. By reason of the pivot means incorporated in the towing connection the trailer frame as a whole can swing laterally as required about the vertical axis of pivot rod 54 relatively to the traction vehicle, and can also swing in relation to that vehicle about the horizontal axis of pivot rod 52. In addition, the mounting of the towing connection to lift arms on the tractor vehicle, which during grading operations are permitted to rise and fall freely, the trailer frame can move as a whole up and down as required approximately about the axis of the rear wheels of the tractor vehicle.

The modified towing connection of FIG. 5 is more heavily constructed than that of FIGS. 1 and 2 but has the same arrangement of its frame with somewhat modified side pieces 48a and also modified bearing blocks 51a for the pivot rod 52. The side pieces 48a are longer than the parts 48 of FIGS. 1 and 2 and have fixed to their forward ends pivot plates 60 pivoted at 62 to specially formed brackets 61 provided for attachment to a tractor vehicle near each side thereof underneath the rear axle or to equivalent places on an endless track tractor vehicle slightly forward of the rear drive sprocket.

It will be noted that FIG. 3 shows the sub-frame 21 on its right hand side raised as compared with the position shown in FIG. 1, this being due to the lever 38 being assumed to be anchored to the uppermost hole 45 of the right of the plate 43 as seen in FIG. 4.

As shown in FIGS. 1 and 2 the cross-members 111 and 112 may be provided with brackets 63 and 64 for the mounting of a scarifier device 65 (for breaking up clods or other lumps in the surface being graded) and a fluid pressure operated ram 66 (in the form of a piston and cylinder device) for operating it. The device 65 is pivoted to the brackets 63, has a series of spaced blades or tines 65a for engagement with the ground, and is raised and lowered by the ram 66 coupled between it and the brackets 64.

Conveniently the rams 29 and 30 are each provided with an indicator rod 56 see FIGS. 1 and 3 attached at 57 to the bottom anchorage of the ram and slidable in an upper bearing member 58 to facilitate checking the correct adjustment of the rams 29 and 30. The rams 29, 30, 46 and 66 are adapted to be connected by flexible piping to a control valve arrangement (not shown) which may be either on the trailing attachment or on the tractor vehicle and is supplied with fluid from a supply means on the tractor vehicle.

In the use of the trailing attachment described grading can be performed effectively with the grader blades 22 functioning in the same manner as the blade of a much more expensive self-propelled grading implement, whilst permitting the attachment to be turned on a turning circle of exceptionally short radius. This small turning circle is achieved by having the forward part of the trailer frame confined to the region of the longitudinal center line of the trailer frame, thereby permitting the frame 10, 11, 12 to be turned about the pivot pin 54 almost through a right angle from the central position without coming into engagement with the rear wheels or track of the tractor vehicle.

What I claim is:

1. For use with a tractor vehicle, a trailing attachment comprising a trailer frame, laterally spaced supporting wheels mounted on said trailer frame at the rear thereof, a towing connection on said trailer frame at its forward end for attachment to the trailer vehicle, an adjustable grader blade and means mounting said grader blade to depend below and athwart the said trailer frame at a position between the forward end thereof and the wheels at its rear, wherein the said towing connection comprises a tow-bar frame having two side pieces for connection to pivot means on a tractor vehicle, cross bars fixed to the side pieces spaced for and aft between the side pieces, a first pivot rod extending centrally along the tow-bar frame between the cross-bars, a block pivotably mounted on the first pivot rod to rock about an approximately horizontal axis extending substantially longitudinally of the tow-bar frame, a second pivot rod extending substantially vertically from the block and a bearing member embracing the second pivot rod, secured to and extending downwardly from the front of the forward part of the trailer frame.

2. An attachment according to claim 1 comprising pivot brackets for attachment to the under part of the frame of a tractor vehicle and means to pivot the towing connection to said brackets about an approximately horizontal transverse axis.

3. An attachment according to claim 1, wherein the said forward part of the trailer frame forms a backbone-like connection between the towing connection and the rearward part of the trailer frame.

4. An attachment according to claim 1 wherein the rearward part of the trailer frame comprises two longitudinal members diverging laterally rearwards from the said forward part of the trailer frame.

5. An attachment according to claim 1 having a pair of wheels at each side forming tandem wheels supporting the rear end of the trailer frame, a common carrier for each pair of wheels and means pivoting the carriers to rock independently of one another about a common transverse horizontal axis positioned between the axes of the wheels of each pair.

6. An attachment according to claim 2 wherein the said laterally diverging longitudinal members include parts at high level diverging rearwardly at a substantial angle from the rear end of the said forward part of the trailer frame and other parts continuing rearwardly with a more gradual divergence and a downward slope to the rear wheel mountings.

7. An attachment as claimed in claim 1, in which the means mounting said grader blade comprises a sub-frame, means mounting the grader blade adjustably on the sub-frame and means mounting the sub-frame to the said trailer frame having a bracket at the front end of the forward end, a horizontal pivot rod mounted to turn in a bearing in said bracket about an axis extending longitudinally of the trailer frame, a forked member extending rearwardly from the said horizontal pivot rod and embracing a forward end part of the sub-frame, an upstanding pivot pin coupling said forked member to the forward end part of the sub-frame to permit limited lateral movement of the sub-frame, fluid pressure operated rams one at each side of the trailer frame acting on the rearward part of the subframe and mounting means on the trailer frame from which said rams depend, the means mounting the sub-frame to the trailer thus being adapted to rotate the sub-frame about a substantially horizontal axis extending longitudinally of the trailer frame.

8. An attachment as claimed in claim 7, in which the mounting means for the fluid pressure operated rams comprise a lever extending transversely with respect to the trailer frame, anchorages at the opposite ends of the lever for the fluid pressure operated rams, a shaft on which the transverse lever is pivotably mounted, two spaced brackets mounted on the trailer frame to support the two ends of the shaft in a position extending longitudinally of the trailer frame, and plates between which said transverse lever is mounted and which provide alternative clamping positions for the said transverse lever at different pivotal positions of said lever to provide for alternative setting of the grader blade around the said substantially horizontal axis extending longitudinally of the trailer frame.

9. An attachment as claimed in claim 7 in which the means mounting the grader blade adjustably on the sub-frame comprises a ring on which the grader blade is mounted under the said sub-frame adjustable about an upstanding axis concentric with the ring, a fluid pressure operated ram fitted between the ring and a bracket on the sub-frame for turning the grader blade, and a steadying link adjustable in length connected between the rearward part of the sub-frame and a bracket depending from the trailer frame.

10. For use with a tractor vehicle, a trailing attachment comprising a frame, laterally spaced supporting wheels mounted on said frame at the rear thereof, a towing connection mounted on said frame at its forward end for attachment to the tractor vehicle, an adjustable grader blade and means mounting said grader blade to depend below and athwart the said frame at a position between the forward end thereof and the wheels at its rear, wherein the said towing connection comprises pivot means permitting the trailer frame to turn relatively to the tractor vehicle both about a vertical axis and about an approximately horizontal axis extending longitudinally of the tractor vehicle, a sub-frame, means mounting the said grader blade adjustably thereon, means mounting said sub-frame to extend under the said forward part of the trailer frame, said sub-frame mounting means including, a bracket at the front end of said forward part and a pivotal connection between said sub-frame and bracket permitting limited lateral movement of the sub-frame and also free rotational movement of said sub-frame about a horizontal axis extending longitudinally of the trailer frame, fluid-pressure-operated rams one at each side acting on the rearward part of the sub-frame, mounting means on the trailer frame from which said rams depend, the anchorage of the sub-frame to the bracket on the trailer frame comprising a horizontal pivot-rod mounted to turn in a bearing in said bracket about an axis extending longitudinally of the trailer frame, a forked member extending rearwardly from said pivot rod and embracing a forward end part of the sub-frame, and an upstanding pivot pin coupling said forked member to the forward end part of the sub-frame.

11. For use with a tractor vehicle, a trailing attachment comprising a frame laterally spaced supporting wheels mounted on said frame at the rear thereof, a towing connection mounted on said frame at its forward end for attachment to the tractor vehicle, an adjustable grader blade and means mounting said grader blade to depend below and athwart the said frame at a position between the forward end thereof and the wheels at its rear, wherein the said towing connection comprises pivot means permitting the trailer frame to turn relatively to the tractor vehicle both about a vertical axis and about an approximately horizontal axis extending longitudinally of the tractor vehicle, a sub-frame, means mounting the said grader blade adjustably thereon, means mounting said sub-frame to extend under the said forward part of the trailer frame, said sub-frame mounting means including, a bracket at the front end of said forward part and a pivotal connection between said sub-frame and bracket permitting limited lateral movement of the sub-frame and also free rotational movement of said sub-frame about a horizontal axis extending longitudinally of the trailer frame, fluid-pressure-operated rams one at each side acting on the rearward part of the sub-frame, mounting means on the trailer frame from which said rams depend, a transverse lever, anchorages at opposite ends thereof for the fluid-pressure-operated rams acting on the sub-frame, a shaft on which said transverse lever is pivoted, brackets on the rear end of the forward part of the trailer frame to support the ends of said shaft with the shaft extending longitudinally of the trailer frame, and plates between which said transverse lever is mounted and which provide alternative clamping positions at different levels for arms of said transverse lever to provide for alternative settings of the grader blade offset angularly about a horizontal axis extending longitudinally of the trailer frame.

12. For use with a tractor vehicle, a trailing attachment comprising a frame, laterally spaced supporting wheels mounted on said frame at the rear thereof, a towing connection mounted on said frame at its forward end for attachment to the tractor vehicle, an adjustable grader blade and means mounting said grader blade to depend below and athwart the said frame at a position between the forward end thereof and the wheels at its rear, wherein the said towing connection comprises pivot means permitting the trailer frame to turn relatively to the tractor vehicle both about a vertical axis and about an approximately horizontal axis extending longitudinally of the tractor vehicle, a sub-frame, means mounting the said grader blade adjustably thereon, means mounting said sub-frame to extend under the said forward part of the trailer frame, said sub-frame mounting means including, a bracket at the front end of said forward part and a pivotal connection between said sub-frame and bracket permitting limited lateral movement of the sub-frame and also free rotational movement of said sub-frame about a horizontal axis extending longitudinally of the trailer frame, fluid-pressure-operated rams one at each side acting on the rearward part of the sub-frame, mounting means on the trailer frame from which said rams depend, a rotatable ring on which the grader blade is mounted under the said sub-frame 20 as to be adjustable about an upstanding axis on the sub-frame concentric with the ring, a fluid pressure operated ram fitted between the ring and a bracket on the sub-frame for turning the ring to adjust the grader blade, and a steadying link adjustable in length connected between the rearward part of the sub-frame and a bracket depending from the trailer frame.

* * * * *